United States Patent [19]

Schnorf

[11] Patent Number: 5,500,933
[45] Date of Patent: Mar. 19, 1996

[54] DISPLAY SYSTEM WHICH DISPLAYS MOTION VIDEO OBJECTS COMBINED WITH OTHER VISUAL OBJECTS

[75] Inventor: Peter Schnorf, Palo Alto, Calif.

[73] Assignee: Canon Information Systems, Inc., Costa Mesa, Calif.

[21] Appl. No.: 360,122

[22] Filed: Dec. 20, 1994

Related U.S. Application Data

[63] Continuation of Ser. No. 53,352, Apr. 28, 1993, abandoned.

[51] Int. Cl.$^6$ ................................................ G06T 7/20
[52] U.S. Cl. ................................... 395/154; 395/134
[58] Field of Search ................................... 395/134, 152, 395/154, 155, 157, 158, 161

[56] References Cited

U.S. PATENT DOCUMENTS

| | | | |
|---|---|---|---|
| 4,412,296 | 10/1983 | Taylor | 364/521 |
| 4,599,611 | 7/1986 | Bowker et al. | 340/721 |
| 4,689,616 | 8/1987 | Goude et al. | 340/725 |
| 4,692,757 | 9/1987 | Tsuhara et al. | 340/721 |
| 4,710,767 | 12/1987 | Sciacero et al. | 340/799 |
| 4,731,606 | 3/1988 | Bantz et al. | 340/709 |
| 4,905,168 | 2/1990 | McCarthy et al. | 395/152 X |
| 4,953,107 | 8/1990 | Hedley et al. | 395/152 X |
| 4,954,819 | 9/1990 | Watkins | 340/721 |
| 4,961,071 | 10/1990 | Krooss | 340/721 |
| 5,001,469 | 3/1991 | Pappas et al. | 340/721 |
| 5,027,212 | 6/1991 | Marlton et al. | 358/183 |
| 5,027,290 | 6/1991 | Kirk et al. | 395/154 |
| 5,050,102 | 9/1991 | Sun et al. | 395/152 |
| 5,057,825 | 10/1991 | Fukoo | 340/721 |
| 5,061,919 | 10/1991 | Watkins | 340/721 |
| 5,079,545 | 1/1992 | Priem et al. | 340/747 |
| 5,109,482 | 4/1992 | Bohrman | 395/154 |
| 5,124,691 | 6/1992 | Sakamoto et al. | 340/721 |
| 5,195,177 | 3/1993 | Kamiyama et al. | 395/134 |
| 5,202,961 | 4/1993 | Mills et al. | 395/155 X |
| 5,214,758 | 5/1993 | Ohba et al. | 395/152 X |
| 5,237,648 | 8/1993 | Mills et al. | 395/134 X |
| 5,297,240 | 3/1994 | Priem et al. | 395/134 |

OTHER PUBLICATIONS

Microsoft Windows User's Guide (Trademark of Microsoft Corporation), 1990, pp. 18, 21–22, 85 & 398–399.
Microsoft Windows User's Guide (Trademark of Microsoft Corporation), 1990, attached sheets #1 & #2.
"Parallax XVideo Product Description", Parallax Graphics, Inc. Oct. 1991.
Schnorf, P. "Integrating Video Into An Application Framework", Proceedings of the 1st ACM International Conference On Multimedia, Aug. 1993.

*Primary Examiner*—Heather R. Herndon
*Assistant Examiner*—Cliff N. Vo
*Attorney, Agent, or Firm*—Fitzpatrick, Cella, Harper & Scinto

[57] ABSTRACT

A system for displaying motion video objects on a display screen together with other visual objects such as bit map image objects, text objects, and the like. An autonomous screen drawing process is provided whereby the motion video object is displayed directly to the screen through a clipmask. When a screen update is needed because of changes in the appearance of one of the objects on the screen, for example, by changing the size, shape or location of one the objects, the autonomous drawing process is stopped. The visual objects and the motion video objects are redrawn to the screen (or to a frame composition memory from which the screen is copied), and for each motion video object a clipmask is initialized in the location and shape of the motion video object. Every other object which overlaps the motion video object leaves its footprint on the clipmask. When all objects have been redrawn, the autonomous drawing process is restarted using the newly-derived clipmask.

38 Claims, 8 Drawing Sheets

1

DISPLAY SYSTEM WHICH DISPLAYS MOTION VIDEO OBJECTS COMBINED WITH OTHER VISUAL OBJECTS

This application is a continuation of application Ser. No. 08/053,352 filed Apr. 28, 1993, now abandoned.

BACKGROUND OF THE INVENTION

1. Field of the Invention

The present invention concerns a system for displaying motion video objects on a computer display screen together with other visual objects such as computer graphic objects, text objects, bit map objects, etc. More particularly, the invention concerns a system for updating such a combined display when objects on the display screen overlap and are manipulated such as by moving the objects or altering their shapes.

2. Description of the Related Art

With recent developments in highly sophisticated and low cost computer hardware, it is now common to find computer systems which process different kinds of data such as image data, voice data and text data in one integrated system. Such multimedia systems are desirable because they can present to a user a wide variety of different kinds of data simultaneously, often with captivating effects.

It is not so common, however, to find such multimedia systems which can process, in addition, motion video information. The reason for this is not because of a lack of hardware devices. To the contrary, highly sophisticated video interface devices are now available which are able, for example, to accept motion analog video information, convert each frame of the analog video information in real time to corresponding digital video information, and provide the digital video information onto a computer bus for processing or display. Rather, the lack of multimedia systems which incorporate motion video information can be traced to a lack of suitable techniques for simultaneously displaying motion video objects with other visual objects such as text and image objects. With existing techniques, it is often necessary for the motion video object to be the top-most object on the display, meaning that it is not possible to display other objects overlapping onto the video object. And often, the motion video is handled only by specialized switching hardware which requires delicate synchronization as it switches between displaying the motion video source and the other displayed objects.

The situation becomes more complicated when it is realized that a truly integrated multimedia system which incorporates motion video objects and other visual objects not only displays motion video objects but also permits both the operator and the system to manipulate them. In particular, motion video objects, as well as other visual objects, are often moved around on the screen or modified by changing size, color, shape, etc. Existing frameworks for updating objects on a display screen are not suitable for updating motion video information.

FIG. 1 shows a typical framework for a screen update sequence known as an "invalidation" or "damage repair" framework. As shown in FIG. 1, it is desired to move object A from the upper left hand side of display screen 10 to the upper right hand side, as shown at 20. Using the invalidation method, first the old region occupied by A is invalidated as shown at 11. Likewise, the new region for object A is invalidated as shown at 12. Then, invalidated regions on the screen are redrawn starting with the lowest layer of objects on the screen and proceeding through to the top-most layer of objects on the screen. Thus, invalidated region 12a is redrawn, first with the background (as shown at 13) and then with object B (as shown at 14). Likewise, invalidated region 12b is redrawn, first with the background (as shown at 15), then with object A (as shown at 16), and finally with object B. The resulting screen displays the desired move of object A from the upper left hand side of the screen to the upper right hand side.

Screen update techniques like the invalidation technique, with its "bottom-up", object drawing sequence, are advantageous (a) because there is no need to redraw the entire screen in each update cycle which would be wasteful in situations where only a small part of the screen has changed, and (b) because each object can simply be drawn to the screen without concern for objects underneath or on top of it and without complicated and costly handling of clipmasks for each object. Nevertheless, screen update techniques found in the art are not suitable when motion video is desired to be displayed. This is because the screen update rate for motion video is simply too high for current computer processes. In particular, a standard NTSC motion video source would require screen updates of 30 screens per second which is simply too high for current systems.

Attempts to circumvent such screen update routines by, for example, simply writing the video information to the screen have also not proved satisfactory. Using the example of FIG. 1, it can be seen that if only the video information is written to the screen without updating the remainder of the screen, then as soon as the next frame for object A is written, object A will immediately overlap object B, as shown in FIG. 2, rather than the desired configuration in which object B overlaps video object A.

SUMMARY OF THE INVENTION

It is an object of the present invention to address the foregoing difficulties by providing a display system which displays motion video objects on a screen together with other visual objects and which provides for suitable manipulation of such objects and a correspondingly updated display of the manipulated objects.

In one aspect of the invention, when a screen update is needed because of a change in objects on the screen, the most recently available frame from the motion video source is drawn like any other visual object using, for example, the invalidation method. Subsequent frames are not, however, drawn using the screen update process. Rather, those frames are drawn directly to the screen using an autonomous screen drawing process which is independent of the screen update process and which bypasses the screen update process. The actual shape of the subsequent frames that are drawn to the screen is controlled by a clipmask which defines the shape of the video frames. Use of the clipmask ensures that any objects which overlie the motion video object are not inadvertently erased when the subsequent frames are drawn to the screen by the autonomous screen drawing process.

The clipmask is formed anew during each screen update cycle. The clipmask is initialized with the desired shape of the motion video object (for example, rectangle, ellipse, text outline, etc.). After that, every other object which overlaps the motion video object leaves its footprint in the clipmask, thereby disabling video for each covered pixel. This ensures that subsequent frames of the motion video object do not erase overlapping objects on the display screen.

Thus, the invention provides a system for displaying motion video objects on a screen together with other visual objects, in which a bit map image representative of one frame of the motion video object is drawn during a screen update cycle, and a clipmask for the video object is derived which reflects the effect of other objects on the appearance of the video object. After the screen update cycle, the motion video object is autonomously displayed through the clipmask on the screen. The display of the motion video object through the clipmask may be provided by an autonomous screen drawing process such as a computer-controlled hardware display loop or a separate software task or thread. The autonomous screen drawing process is stopped upon initiation of a screen update cycle. The motion video object and other graphic objects are drawn, wherein for each motion video object a clipmask is initialized in the shape of the motion video object, a bit map image corresponding to one frame of the motion video object is drawn, and the clip mask is updated to reflect the effect of other displayed objects. The video and visual objects may be drawn to an off-screen memory, in which case the memory is then displayed on the screen. The autonomous display process is restarted using the clipmask just derived.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 2:
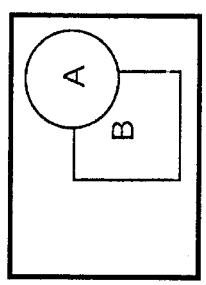
FIGS. 1 and 2 are views for explaining how display screens are updated using invalidation methods with bottom-up drawing.
Figure 1:
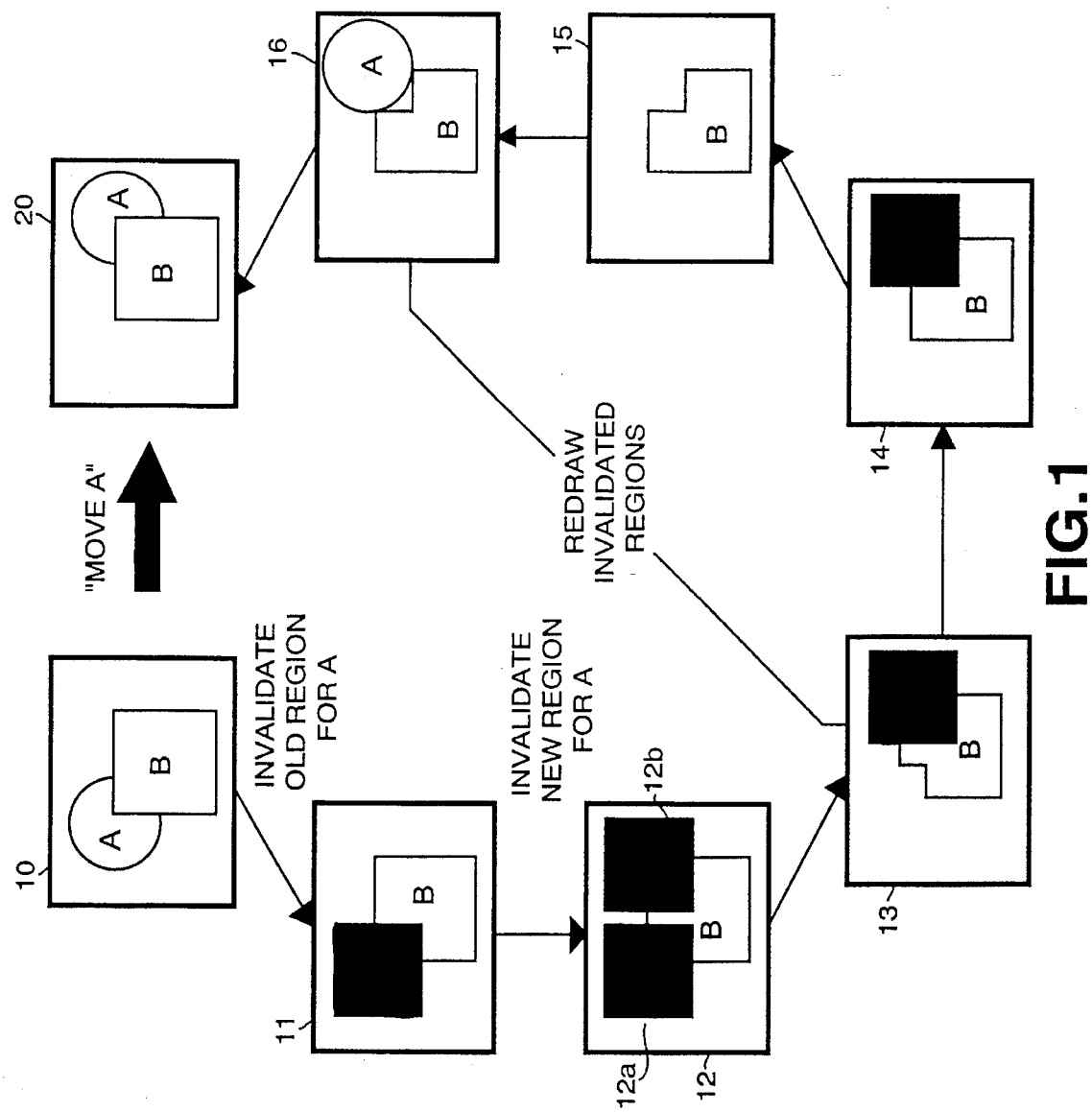
Figure 3:
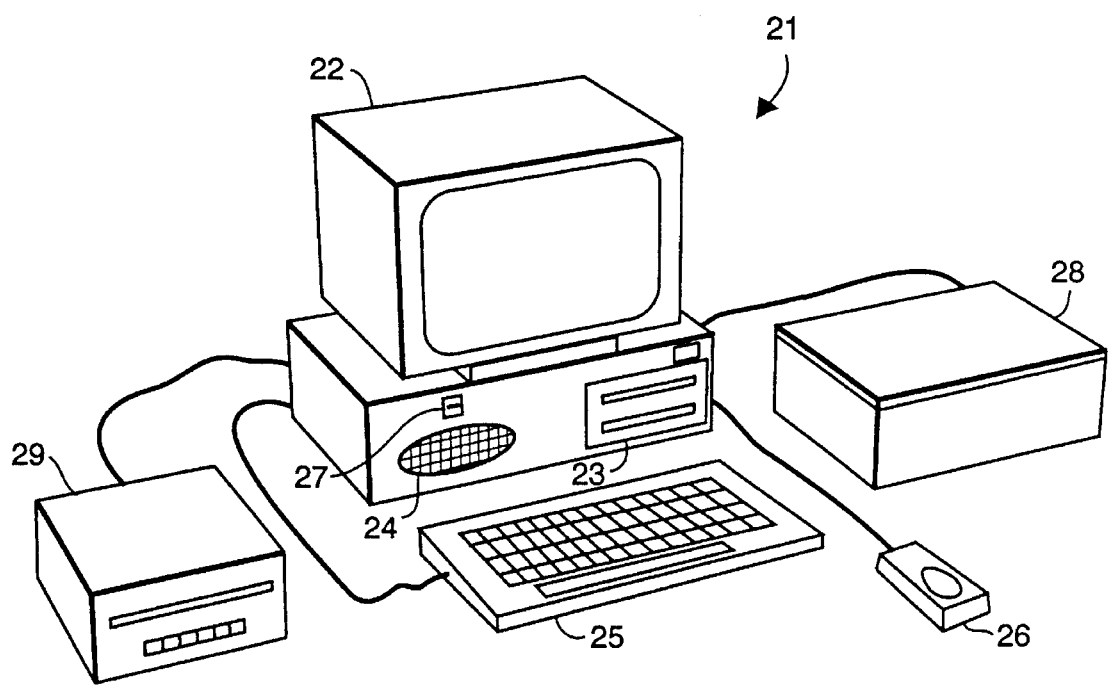
FIG. 3 is a view showing the outward appearance of an apparatus according to the invention.

FIG. 3 is a view showing the outward appearance of a representative embodiment of the invention. Shown in FIG. 3 is computing equipment 21 such as a Sun® SPARCstation having an XWindows windowing system and provided with a display screen 22 such as a color monitor and an internal speaker 24. Computing equipment 21 includes a mass storage device such as computer disk drive 23 for storing data files such as bit map image files, text files, sound files, animation files and digital motion video files, in compressed or uncompressed format, and for storing program files which contained stored program instruction steps by which computing equipment 21 manipulates the data files and presents data in those files to an operator via display screen 22 or speaker 24.

Keyboard 25 is connected to computing equipment 21 to permit input of text data and to permit manipulation of objects displayed on display screen 22. Likewise, pointing device 26 such as a mouse or the like is connected to permit manipulation of objects on the display screen. Microphone 27 permits inputting audio information.

Scanner 28 scans documents or other images and provides bit map images of those documents to computing equipment 21. Other means for supplying bit map image data may be provided, such as CD-ROMs and the like.

Laser disk drive 29 supplies computing equipment 21 with a source of analog motion video information from which suitable video objects may be derived for display on display screen 22. Other means for supplying analog video information may also be provided, such as a video camera or a standard television tuner.

Data may also be inputted into computing equipment 21 from a variety of other, unshown sources, including, for example, an interface to a network or other external source of data such as a modem, a removable floppy disk drive, or an analog still video interface for inputting single frames of analog video information.

In accordance with operator instructions, stored application programs are activated and permit processing and manipulation of data. For example, a drawing editor may be activated to permit an operator to create, view and manipulate visual objects such as text objects, bit map objects, computer graphic objects and motion video objects. Likewise, a document editor may be activated to permit an operator to create, manipulate and view documents on screen 22. Here, "documents" refers to data files which contain a variety of objects such as text objects, bit map objects, computer graphic objects, sound objects and motion video objects. other editors such as spreadsheet programs and similar information processing programs may further be provided on disk 23 for operator selection and use.

Also stored on disk 23 is framework software which is used by the aforementioned application programs (drawing editor, document editor, spreadsheet editor, etc.) to integrate motion video objects into a combined display with other visual objects on screen 22. The framework is an object-oriented application framework which provides predefined visual classes for visual objects such as text or graphics display and user interaction elements as well as integrated control of these elements. The framework is extended in a multitasking environment to support motion video objects in full generality such that the motion video objects are integrated seamlessly with the other visual classes. The video object can appear in any shape and be placed everywhere other visual objects can go, i.e., in scrollable views, as building blocks in graphics editors, as characters in text editors, as items in list or pop-up menus, etc. video objects support the full visual class protocol for client-transparent double buffering, cut/copy/paste/undo operations, and output to or input from files. In this representative embodiment of the invention, the framework was implemented by modifying an existing ET++ framework to include motion video objects, but any other suitable framework, such as Smalltalk, MACApp, InterViews and the NeXT Application Kit can likewise be modified to include video objects.

Figure 4:
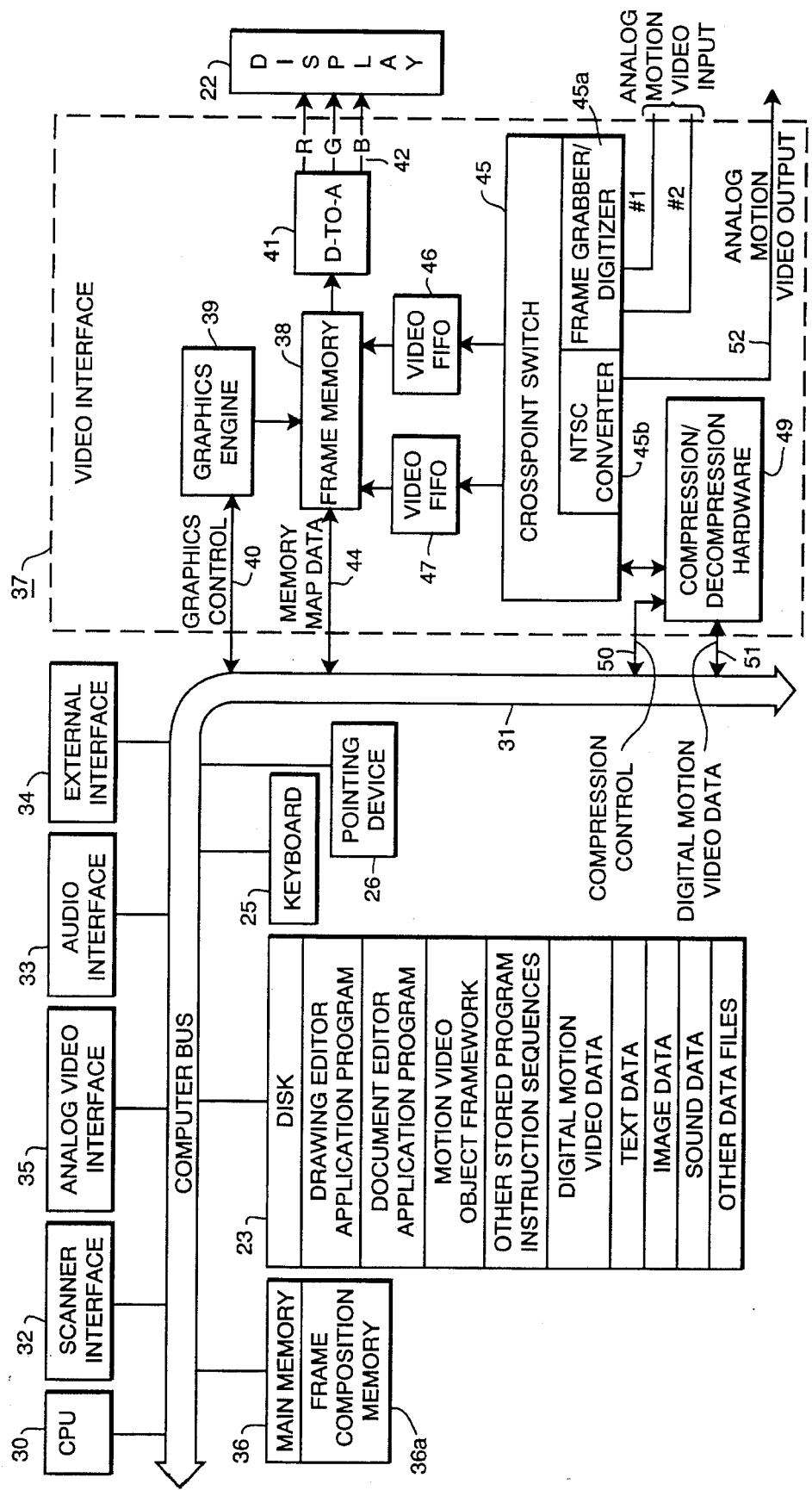
FIG. 4 is a block diagram of the FIG. 3 apparatus.

FIG. 4 is a detailed block diagram showing the internal construction of computing equipment 21. As shown in FIG. 4, computing equipment 21 includes a central processing unit (CPU) 30 such a reduced instruction set computer (RISC) interfaced to computer bus 31. Also interfaced to computer bus 31 is disk 23, keyboard 25 and mouse 26. A scanner interface 32 is provided for interface to scanner 28, an external interface such as a network or a modem interface 34 is provided for interface to external storage media, an analog image interface 35 is provided for accepting analog image information such as image information from a still video camera, and an audio interface 33 for interfacing with microphone 27 and speaker 24. Main memory 36 interfaces to computer bus 31 so as to provide random access memory storage for use by CPU 30. In particular, when executing stored program instruction sequences such as a drawing editor or document editor, CPU 30 loads those instruction sequences from disk 23 (or other memory storage medium) into main memory 36 and executes those stored program instruction sequences out of main memory 36.

Also interfaced to computer bus 31 is video interface circuitry 37, such as a Parallax XVideo 24 SVC-VIO board or other suitable video interface board such as the RasterOps, NeXTDimension and DigitalFilm video interface boards. Video interface 37 permits computing equipment 21 to receive analog motion video information, convert the analog motion video information to digital motion video information, store motion video information together with other computer generated graphic objects to a frame memory, and display the information from the frame memory on display 22.

In more detail, video interface 37 includes a frame memory 38 such as an 1152×900×32 bit memory. The frame memory stores a bit-by-bit map of each pixel for display 22 (1152×900 pixels), and for each pixel stores full 24 bit color information for that pixel. In addition, 8 bits are provided for control of the pixel, such as the source of pixel information (e.g., video source #1 or #2), whether the pixel can be updated, etc. The 8 bit control word is set by graphics engine 39 which, in turn, is controlled via graphics control line 40 by CPU 30.

Each memory location in frame memory 38 is fed to digital-to-analog converter 41 to provide individual analog red, green and blue signals (RGB) 42. The RGB signals 42 are fed to display 22 for presentation to the operator.

Display information is provided to frame memory 38 via memory map data interface 44 from the computer bus under the control of CPU 30. In addition to this source of display information, information may be provided to frame memory 38 from cross point switch 45. Cross point switch 45 includes a frame grabber/digitizer 45a which in real-time accepts frames of analog motion video information such as analog motion video information from laser disk 29, and digitizes that analog motion video information in real time into 24 bit full color digital information. Under control of the 8-bit control word, the digital color information may be fed via dual video FIFO's 46 and 47 to frame memory 38.

Cross point switch 45 may also provide digital motion video information to compression/decompression hardware 49. Compression/decompression hardware 49 is controlled by CPU 30 via compression control line 50. In accordance with that control, the compression/decompression hardware can provide compressed digital motion video information to computer bus 31 via digital motion video data line 51. The compressed digital motion video information may be stored by CPU 30 in disk 23 or other desired storage media.

Conversely, CPU 30 may also retrieve stored digital motion video information, such as compressed video information from disk 23, and provide the stored digital motion video information to compression/decompression hardware 49 via computer bus 31 and digital motion video data line 51. The compression/decompression hardware provides uncompressed digital motion video information to cross point switch 45 which, in turn, stores that information via dual video FIFO's 46 and 47 into frame memory 38.

Cross point switch 45 also retrieves the display stored in frame memory 38 via video FIFO 46 and in real-time converts that display into NTSC format using NTSC converter 45b. The NTSC video information may be provided for storage on external media such a video tape recorder via motion video output port 52.

FIGS. 5 to 9 are flow diagrams showing operation of the FIG. 4 apparatus in accordance with the video object framework of the present invention. The process steps shown in these figures are executed by CPU 30 in accordance with stored program instructions stored in main memory 36.

FIGS. 5 to 9 are presented as separate flow diagrams to reflect the object-oriented implementation of the invention, in which separate and self-reliant software objects are provided for separable data processing tasks. Object-oriented implementations are preferred since every drawing operation goes through drawing objects in the framework and there is therefore no need for client applications (such as the document or drawing editor) to handle those operations. It is to be understood, however, that other implementations including non-object-oriented implementations are also possible.

In step S501, CPU 30 initiates an application program, such as the aforementioned drawing editor or document editor, which uses the video object framework to display motion video objects on screen 22 together with other visual objects. In general, and as detailed below, motion video objects are displayed differently than other visual objects. Other visual objects are drawn to screen 22 during the redraw cycle of an invalidation-based screen update cycle, and their display on the screen is simply maintained until the next redraw cycle. On the other hand, until a screen update cycle occurs, frames for motion video objects are continuously displayed to the screen using an autonomous screen drawing process which bypasses the update cycle and which draws the motion video object directly into frame memory 38. The screen drawing process operates strictly to draw frames of motion video objects to frame memory 38, and it operates autonomously and independently of the screen update process by which the other visual objects on the screen are updated. The screen drawing process preferably does not simply draw frames of the video object to the screen, but rather scales the frames of the video object as needed and draws the scaled video object to the screen through a clipmask, the derivation of which will be described presently. The autonomous screen drawing process may be a computer-controlled hardware display loop or it may be a separate software task or thread. One such process is provided for each video object and the type of process is ordinarily selected in accordance with the source of the video information for the object. More particularly, the motion video objects may be provided from any source, for example, from an analog motion video souce input into cross point switch 45 from an analog video source such as laser disk 29, or from a stored digital motion video sequence such as a sequence stored on disk 23 or on another medium. In the case of analog motion video, a computer-controlled hardware display loop using video interface circuitry 37 is preferred for autonomously displaying the video object to the screen. The clipmask in this situation is defined using the 8 bit control word for each pixel of frame memory 38, as set by graphics engine 39 under control of CPU 30. In the case of digital motion video (or animation) stored on disk 23, the autonomous screen drawing process is preferably a software task (or thread) that is separate from the application and from the video framework. The clipmask in this situation is a software-defined clipmask and it is applied in connection with software decompression routines (such as MPEG) or in connection with hardware decompression (such as at 49), if such decompression is needed.

Figure 10:
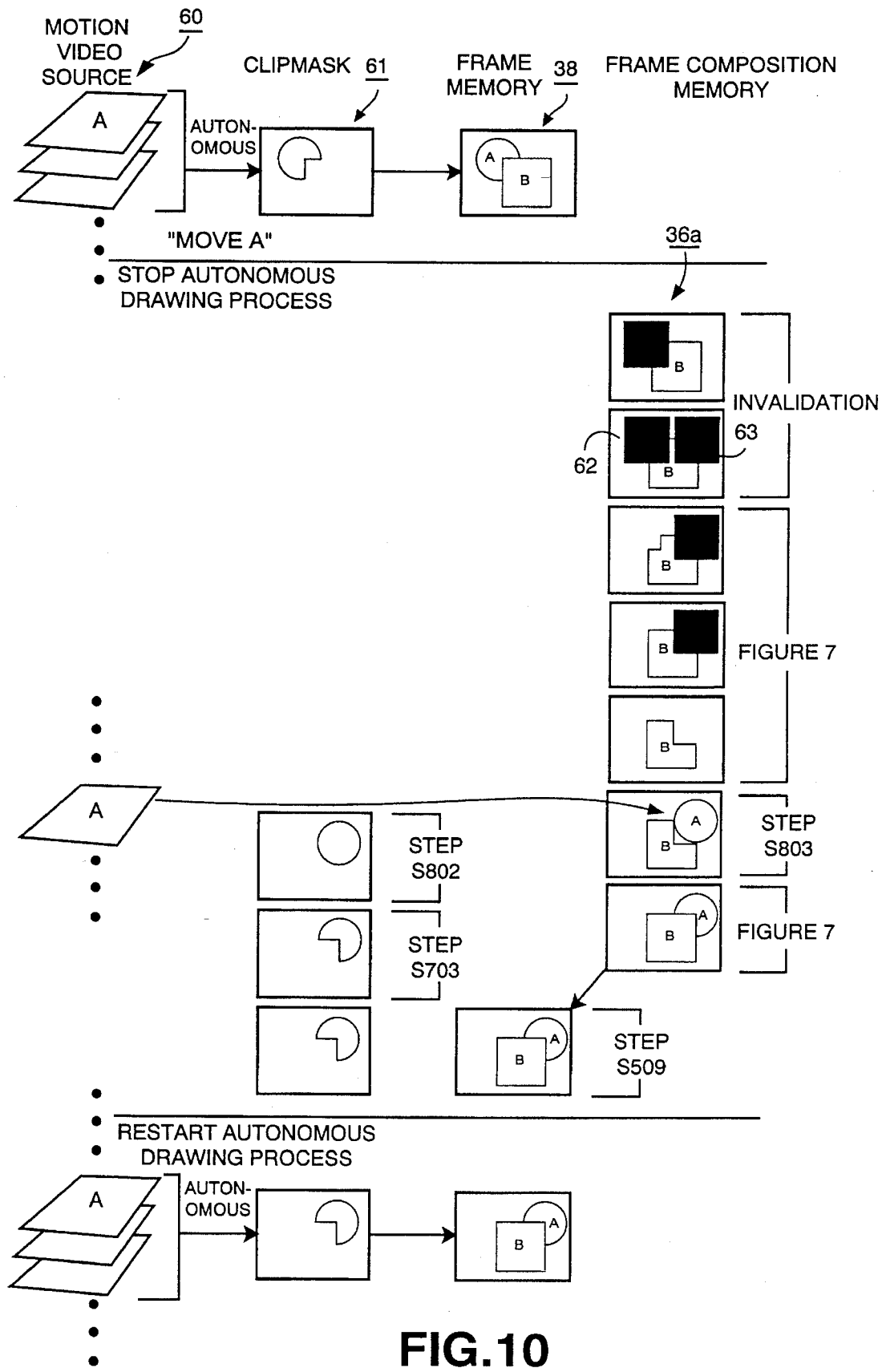
FIG. 10 is a view for explaining the update method of FIGS. 5 to 9.

FIG. 10 illustrates this autonomous screen drawing process. As shown in FIG. 10, a sequence 60 of motion video frames is autonomously drawn through a clipmask 61 into frame memory 38. A separate clipmask is provided for each motion video object. The shape of the clipmask allows motion video object A to be displayed on the same screen display as other visual objects such as graphic object B without overwriting overlapping objects. Autonomous drawing continues until there is a need for a screen update cycle.

In step S502, the framework invalidates the entire screen in preparation for drawing the screen for the first time. The event loop of the framework is then entered (step S503).

In step S504, the framework determines whether there are any invalidated regions and a corresponding need to update visual and/or video objects on the screen display. A screen update cycle is needed in the case where objects on the screen have been manipulated, for example, by operator or application program changes which move the object, change the size, color or shape of the object, scroll the screen, etc. If there is no need to update the screen display, then pending events such as mouse 26 movement events or mouse button press events in the application are processed (step S505) whereupon flow returns to step S504. During this processing, the framework continues to use the autonomous screen drawing process to draw the motion video object into frame memory 38 through the clipmask.

Figure 6:
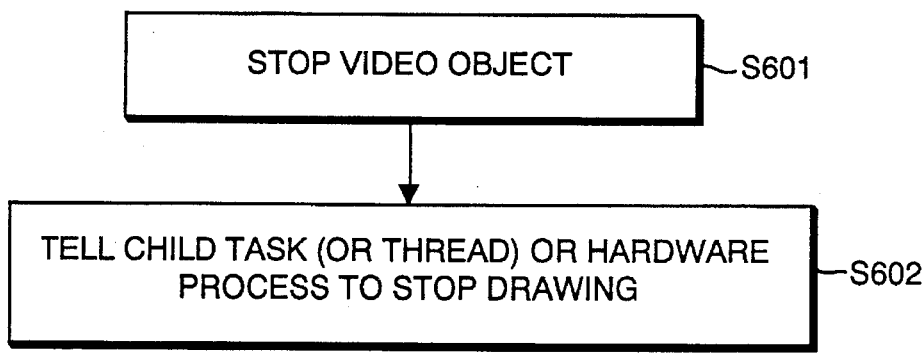

When there is a need to update the screen display, then flow advances to step S506 in which the framework stops all autonomous screen drawing of motion video to frame memory 38. Stop processing for the autonomous drawing processes is shown in FIG. 6 in which it is seen that in response to a stop request (step S601), the video object instructs its autonomous drawing process (i.e., its child hardware process or software task or thread) to stop drawing.

In successive steps, described below, invalidated regions on the screen are redrawn and the autonomous drawing processes are restarted. In the case where invalidated regions contain a motion video object, a bit map representation of the most recent frame from the video object is drawn, and a clipmask is initialized at the initial location and shape of the video object. As subsequent objects are drawn over the video objects, those objects leave their footprint on the respective clipmasks. Then, after all invalidated regions have been redrawn, autonomous screen drawing of the video objects to the screen is restarted using the new clipmasks. These steps are detailed below.

Figure 7:
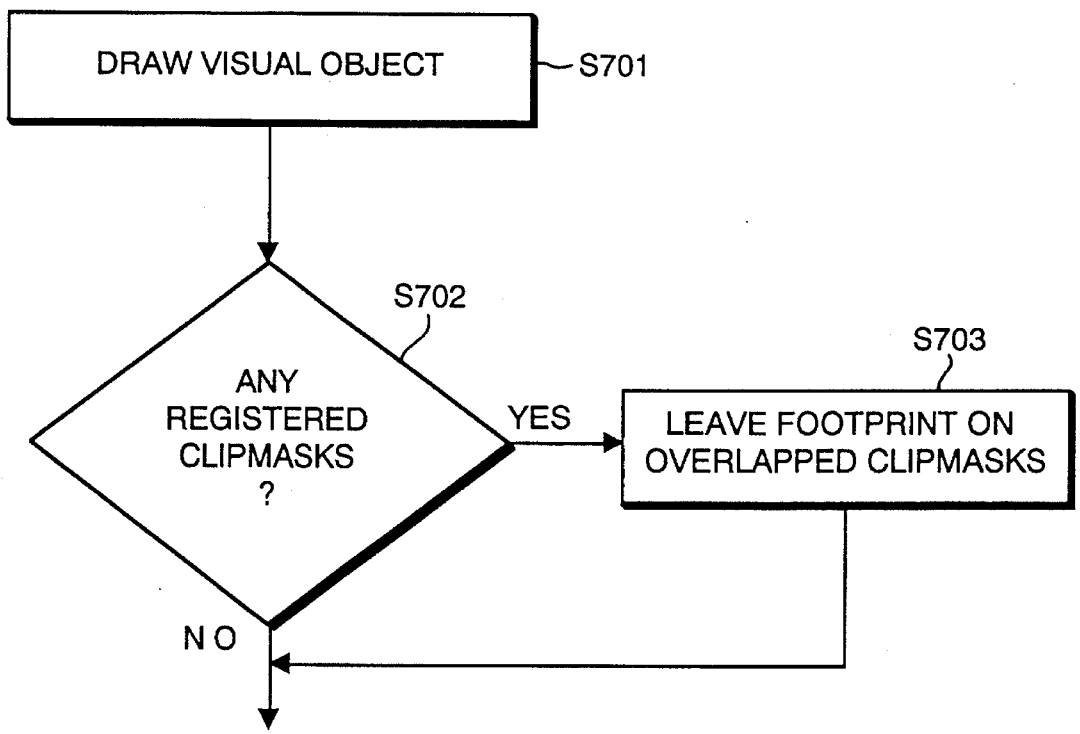

Thus, in step S507, after the autonomous drawing processes have been stopped, invalidated regions of the display are redrawn using bottom-up invalidation redrawing into frame composition memory 36a. When a non-video visual object is encountered during the redraw, invalidation redrawing is performed as shown in FIG. 7. As each such visual object is redrawn (step S701), the framework is checked to determine whether any clipmasks for motion video objects have been registered with the framework (step S702). If there are any registered clipmasks, then in step S703 if the visual object overlaps onto the registered clipmasks, the footprint of the visual object is left on every overlapped clipmask so that subsequent autonomous drawing of the motion video object will not overwrite overlapping visual objects.

Figure 8:
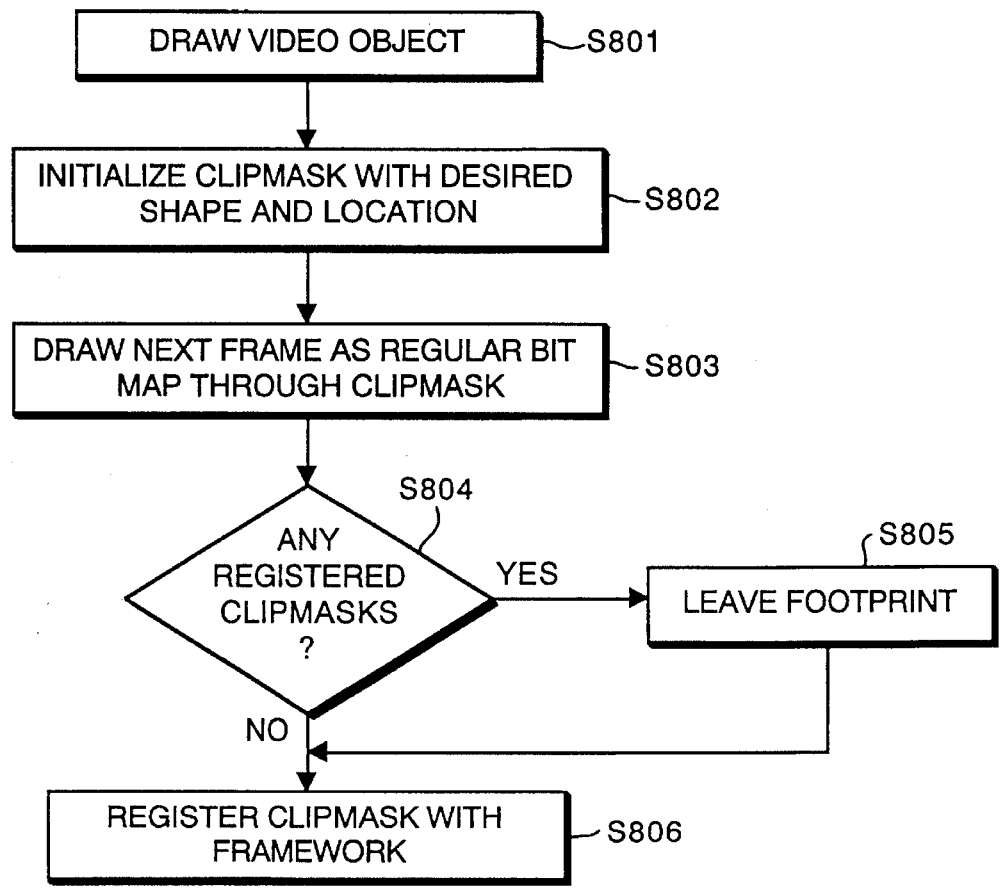

When a motion video object is encountered during the redraw, invalidation redrawing is performed as shown in FIG. 8. In response to a draw request (step S801), a clipmask for the video object is initialized in the desired shape and location of the video object (step S802). Next, in step S803, a bit map corresponding to the most recent frame of the video object is drawn into frame composition memory 36a. Most preferably, the most recently available frame of the video object is obtained for drawing into composition memory 36a. with the FIG. 4 apparatus, however, it is difficult to obtain the most recent frame from the video object. Accordingly, a bit map which simply corresponds or is in other ways representative of the most recent frame is drawn to frame composition memory 36a. For example, a neutral grey bit map may be drawn, or a frame which is not the most recent frame may be drawn.

In step S804, the framework is checked to determine whether any clipmasks for motion video objects have been registered. If there are any registered clipmasks, then in step S805 if the current motion video object overlaps onto the registered clipmasks, the footprint of the current motion video object is left on every overlapped clipmask so that the current motion video object will not subsequently be overwritten by other video objects which it overlaps.

In any event, flow then advances to step S806 where the clipmask for the current motion video object is registered with the framework.

FIG. 10 shows this redrawing process in more detail. In FIG. 10 it is desired to move motion video object A from the upper left hand corner of the screen to the upper right hand corner of the screen. Accordingly, both the upper left hand region of the screen and the upper right hand region of the screen are invalidated, and those invalidated regions are then redrawn- In this regard, this embodiment of the invention does not redraw the screen directly into frame memory 38 but rather makes changes in frame composition memory 36a. This is done to avoid undesirable flicker in the displayed image: if the contents of frame memory 38 are immediately displayed on display 22, when changes are made to memory 38 those changes are immediately reflected on the screen, and flicker results as invalidated regions are redrawn. To avoid flicker, changes are made in frame composition memory 36a, and when all changes have been made, frame composition memory 36a is copied directly to frame memory 38. Of course, if flicker is acceptable or if for some reason frame composition memory 36a is otherwise not used, then changes may be made directly in frame memory 38.

As shown in FIG. 10, invalidated regions are redrawn starting from the lower-most layer of the invalidated region and continuing through to the upper-most layer. More particularly, for invalidated region 62, first the background then visual object B are redrawn. Neither of these objects are motion video objects and they are accordingly redrawn into frame composition memory 36a using FIG. 7 processing. Likewise, in the case of invalidated region 63, first, the background for that region is redrawn. Since the background is not a motion video object, the background is simply redrawn as shown in FIG. 10.

When motion video object A is encountered, clipmask 61 is initialized with the desired shape and location of the video object as described in connection with step S802. Flow then advances to step S803 in which the video object is redrawn and then to step S806 where clipmask 61 is registered with the framework. The framework continues to redraw visual objects and, as shown in FIG. 10, next encounters a non-motion video object, namely the remainder of object B. Since the object is a non-motion video object, the framework simply redraws the object into frame composition memory 36a. The footprint of object B is, however, left on all overlapped clipmasks for video objects. Thus, as shown in FIG. 10, clip mask 61 is altered so as to leave the footprint of the remainder of object B.

Figure 5:
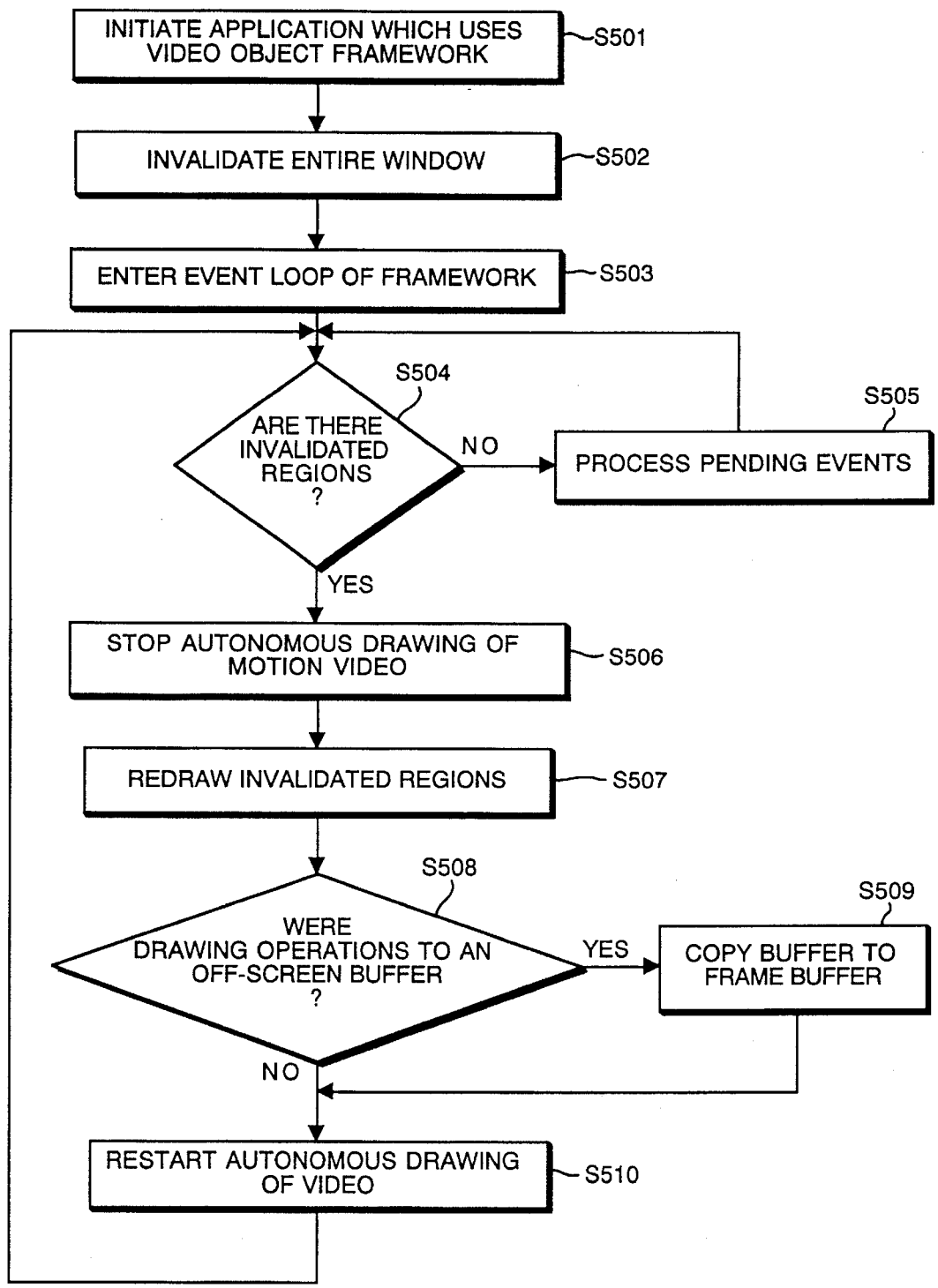
FIGS. 5 to 9 are flow diagrams showing a method for updating a screen display according to the invention.

Reverting to FIG. 5, when the framework has concluded redrawing all invalidated regions, flow advances to step S508 where if the redrawing process was performed to frame composition memory 36a the contents of frame composition memory 36a are copied (step S509) to frame memory 38 for display on display 22. The framework then restarts the autonomous drawing process for drawing motion video to frame memory 38 (step S510). Flow then returns to step S504 where, in the absence of a need to update the screen display, event processing continues while the motion video object is autonomously drawn into frame memory 38 through the most recently derived clipmask.

Figure 9:
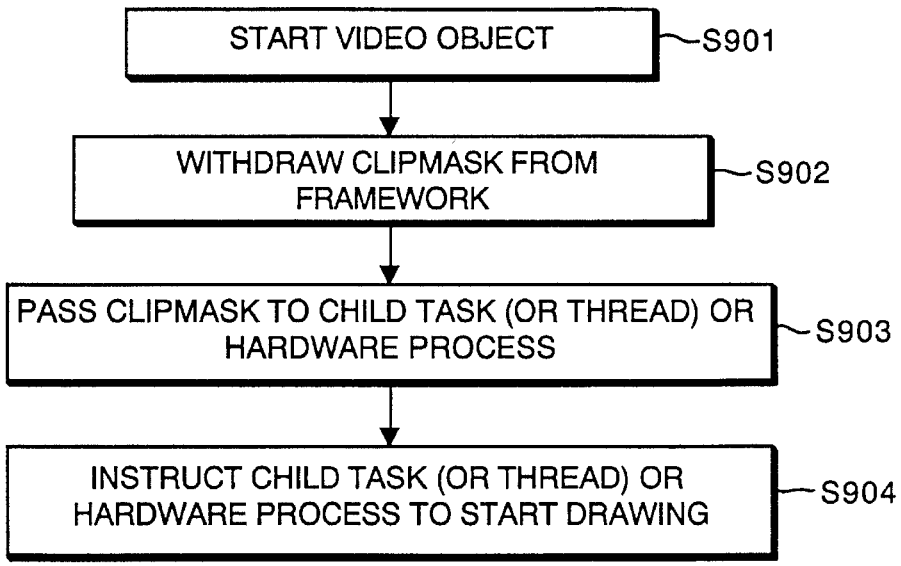

FIG. 9 details the procedure by which the autonomous drawing processes are restarted. In response to a restart request (step S901), the video object withdraws (or unregisters) its clipmasks from the framework (step S902). Then, in step S903, the clipmask is passed to the appropriate child process (hardware or software task or thread). In step S904 the child process is instructed to start drawing the motion video objects autonomously to the screen using the clipmasks passed to them in step S903.

Figure 11:
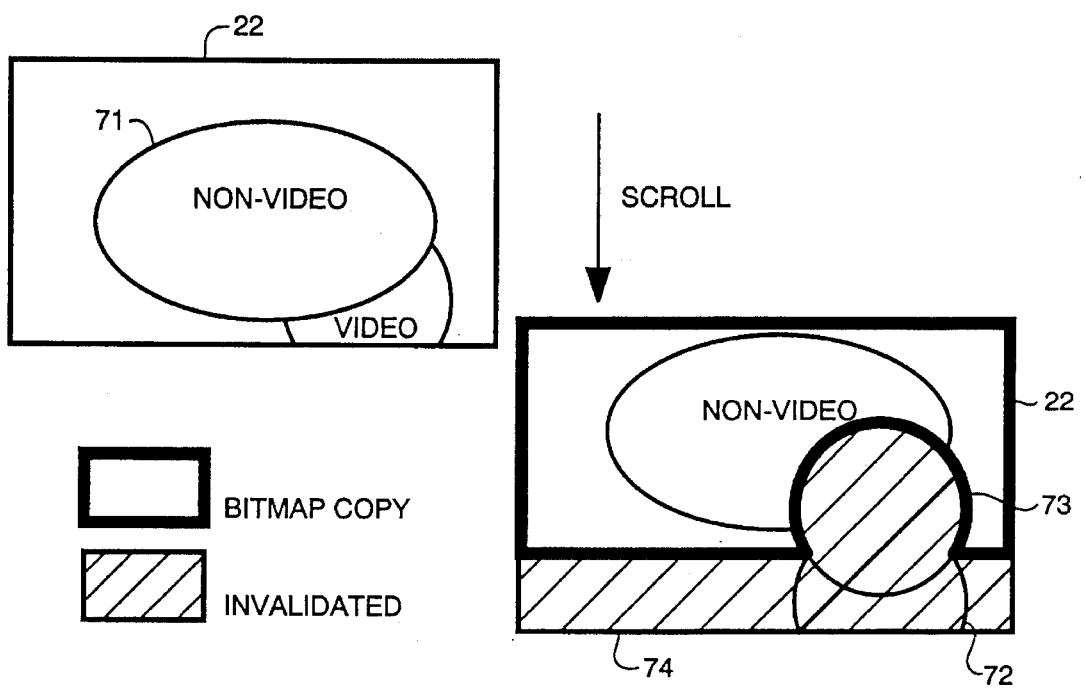
FIG. 11 is a view for explaining how a screen display is updated when the display is scrolled.

FIG. 11 shows a modification of the invalidation technique useful when the screen is simply scrolled upwardly or downwardly. More particularly, when using the invalidation technique, the entire screen is invalidated when the screen is scrolled upwardly or downwardly, which would necessitate redrawing the entire screen. FIG. 11 shows a more efficient method of scrolling whereby it is not necessary to invalidate the entire screen. Rather, as shown in FIG. 11, non-motion video objects in the scrolled portion of the screen, such as visual object 71 and background objects, are simply recopied from their old locations on the screen to their new locations. The old and new locations 72 and 73 of video objects are invalidated together with that portion of the screen newly-uncovered by the scrolling operation (portion 74). Redrawing of invalidated regions proceeds as described in the figures above.

What is claimed is:

1. A computer-implemented method for controlling a hardware video interface so as to combinedly display a motion video object and other visual objects in a windowing display system comprising the steps of:

controlling the hardware video interface to execute an autonomous hardware loop in which successive frames of analog motion video information are received, the successive frames of analog motion video information are each converted to successive frames of digital motion video information, and the successive frames of digital motion video information are each stored through a clipmask to a memory so as to constitute a motion video object, whereby at least one motion video object is automatically displayed through a corresponding clipmask onto a screen;

stopping execution of the autonomous hardware loop in response to initiation of a screen update cycle;

drawing the motion video object and another visual object to the memory, wherein for each motion video object, said drawing step includes the steps of initializing a clipmask in the shape of the motion video object, drawing to the memory a bit map image corresponding to one frame of the motion video object, and updating the clipmask to reflect how overlapping objects affect the motion video object;

displaying the memory on the screen; and re-starting execution of the autonomous hardware loop using the clipmask obtained in said drawing step.

2. A method according to claim 1, wherein the bit map image which corresponds to one frame of the motion video object and which is drawn to memory is comprised by a frame of the motion video object.

3. A method according to claim 1, wherein the bit map image which corresponds to one frame of the motion video object and which is drawn to memory is not comprised by a frame of the motion video object.

4. A method according to claim 3, wherein the bit map image which corresponds to one frame of the motion video object and which is drawn to memory is comprised by a neutral grey bit map image.

5. A method according to claim 1, wherein said drawing step draws to the same frame memory from which the screen is displayed.

6. A method according to claim 1, further comprising the step of copying the memory to a frame memory from which the screen is displayed.

7. A method according to claim 1, wherein said drawing step is an invalidation-based method of memory update whereby only a portion of said memory is redrawn.

8. A method according to claim 7, wherein a screen update cycle is initiated by manipulation of objects on the screen.

9. A method according to claim 8, further comprising the step of invalidating changed regions of the screen, wherein in said drawing step only invalidated regions are drawn.

10. A method according to claim 7, wherein a screen update cycle is initiated by scrolling.

11. A method for combining motion video objects and other visual objects in a windowing display system comprising the steps of:

autonomously displaying at least one motion video object through a corresponding clipmask onto a screen;

stopping said displaying step in response to initiation of a screen update cycle;

drawing the motion video object and another visual object to a memory, said drawing step being an invalidation-based method of memory update whereby only a portion of said memory is redrawn, wherein for each motion video object, said drawing step includes the steps of initializing a clipmask in the shape of the motion video object, drawing to the memory a bit map image corresponding to one frame of the motion video object, and updating the clipmask to reflect overlapping objects;

displaying the memory on the screen; and re-starting said autonomous displaying step using the clipmask obtained in said drawing step;

wherein a screen update cycle is initiated by scrolling, and further comprising the steps of copying non-motion video objects to a scrolled location in memory, invalidating old and new positions of the motion video object, and invalidating regions uncovered by scrolling.

12. A computer-implemented method for controlling a hardware video interface so as to permit editing of a motion video object as well as other displayed visual objects comprising:

drawing a visual object to a memory;

a first display step of displaying the memory such that the visual object is displayed on a display, and responding to commands for changing the visual object;

a second display step of displaying the motion video object and responding to commands for changing the motion video object, said second display step including the step of controlling the hardware video interface to execute an autonomous hardware loop in which successive frames of analog motion video information are received, the successive frames of analog motion video information are each converted to successive frames of digital motion video information, and the successive frames of digital motion video information are each stored through a clipmask to a memory so as to constitute a motion video object, whereby the motion video object is displayed through a clipmask directly to the display and autonomously of display of the visual object;

a detecting step of detecting manipulation of a displayed object; and in response to detecting manipulation of a displayed object, a step of updating the display, said updating step including the steps of stopping execution of the autonomous hardware loop, drawing the motion video object to the memory and initializing a clipmask for the motion video object, redrawing the visual object to the memory and updating the clipmask to reflect overlap of the visual object on the motion video object, restarting the first display step, and restarting said second display step using the updated clipmask, whereby execution of the autonomous hardware loop is re-started so as to display the motion video object through the updated clipmask directly to the display and autonomously of display of the visual object.

13. A method according to claim 12, wherein in said step of drawing the motion video object to memory, a bit map image corresponding to one frame of the motion video object is redrawn.

14. A method according to claim 13, wherein the bit map image which corresponds to one frame of the motion video object and which is drawn to memory is comprised by a frame of the motion video object.

15. A method according to claim 13, wherein the bit map image which corresponds to one frame of the motion video object and which is drawn to memory is not comprised by a frame of the motion video object.

16. A method according to claim 15, wherein the bit map image which corresponds to one frame of the motion video object and which is drawn to memory is comprised by a neutral grey bit map image.

17. A method according to claim 12, wherein in said second display step, the motion video object is displayed from a frame memory, and wherein said redrawing step redraws to said frame memory.

18. A method according to claim 12, wherein in said second display step, the motion video object is displayed from a frame memory and wherein said drawing step redraws to a different frame composition memory, and further comprising the step of copying the frame composition memory to the frame memory.

19. A method according to claim 12, wherein said updating step further includes the step of invalidating changed regions of the display, wherein in said redrawing step only invalidated regions are redrawn.

20. A method according to claim 19, wherein said detecting step detects scrolling.

21. A method for editing displayed visual objects comprising:

drawing a first visual object to a memory;

a first display step of displaying the memory such that the first visual object is displayed on a display, and responding to commands for changing the first visual object;

a second display step of displaying a second visual object comprised by a motion video object and responding to commands for changing the second visual object, said second display step including the step of displaying the second visual object through a clipmask directly to the display and autonomously of display of the first visual object;

a detecting step of detecting manipulation of a displayed object, wherein said detecting step detects scrolling; and in response to detecting manipulation of a displayed object, a step of updating the display of the first and second visual objects, said updating step including the steps of stopping said autonomous display step, copying the first visual object to a scrolled location, invalidating old and new positions of the second visual object, invalidating regions uncovered by scrolling, drawing invalidated regions of the second visual object to the memory and initializing a clipmask for the second visual object, redrawing invalidated regions of the first visual object to the memory and updating the clipmask to reflect overlap of the first visual object on the second visual object, restarting the first display step, and restarting said second display step using the updated clipmask.

22. Apparatus for combinedly displaying a motion video object combined with other visual objects comprising:

a memory to which at least one visual object is drawn and to which a hardware video interface autonomously stores successive frames of digital motion video information, the hardware video interface autonomously storing successive frames of digital motion video information to said memory by executing an autonomous hardware loop in which successive frames of analog motion video information are received, the successive frames of analog motion video information are each converted to successive frames of digital motion video information, and the successive frames of digital motion video information are each stored through a clipmask to the memory so as to constitute the motion video object;

a display for displaying contents of said memory;

an operator interface by which an operator may request manipulation of displayed objects;

a program memory for storing program instruction sequences including program sequences for effecting manipulations requested with said operator interface; and a processor for executing the instruction sequences stored in said program memory;

wherein the instruction sequences include steps to (a) control the hardware video interface to execute the autonomous hardware loop so as to autonomously display a motion video object through a clipmask onto the display, (b) stop execution of the autonomous hardware loop in response to initiation of an update cycle, (c) draw the motion video object and the other visual object to said memory, (d) initialize a clipmask in the shape and location of the motion video object, (e) update the clipmask to reflect how overlapping objects affect the motion video object, (f) display the memory on the display, and (g) re-start execution of the autonomous hardware loop using the updated clipmask.

23. An apparatus according to claim 22, wherein when the motion video object is redrawn to memory, a bit map image corresponding to one frame of the motion video object is redrawn.

24. An apparatus according to claim 23, wherein the bit map image which corresponds to one frame of the motion video object and which is drawn to memory is comprised by a frame of the motion video object.

25. An apparatus according to claim 23, wherein the bit map image which corresponds to one frame of the motion video object and which is drawn to memory is not comprised by a frame of the motion video object.

26. An apparatus according to claim 25, wherein the bit map image which corresponds to one frame of the motion video object and which is drawn to memory is comprised by a neutral grey bit map image.

27. An apparatus according to claim 22, wherein the motion video object is autonomously displayed from a frame memory.

28. An apparatus according to claim 22, wherein the motion video object is autonomously displayed from a frame memory, and wherein said memory is comprised by a frame composition memory, and further comprising copying means for copying the frame composition memory to the frame memory.

29. An apparatus according to claim 22, wherein said updating step stored in said program memory further includes steps to invalidate changed regions of the display, and wherein only invalidated regions are drawn.

30. An apparatus according to claim 29, wherein manipulations include scrolling.

31. Apparatus for displaying motion video objects combined with other visual objects comprising:
a memory to which at least one visual object is drawn;
a display for displaying contents of said memory and for autonomously displaying the motion video object;
an operator interface by which an operator may request manipulation of displayed objects, wherein manipulations include scrolling;
a program memory for storing program instruction sequences including program sequences for effecting manipulations requested with said operator interface; and
a processor for executing the instruction sequences stored in said program memory;
wherein the instruction sequences include steps to (a) autonomously display a motion video object through a clipmask onto the display without storage in said memory, (b) stop said autonomous display in response to initiation of an update cycle, (c) copy the other visual object to a scrolled location, (d) invalidate old and new positions of the motion video object, (e) invalidate regions uncovered by scrolling, (f) draw invalidated regions of the motion video object and the other visual object to said memory, (g) initialize a clipmask in the shape and location of the motion video object, (h) update the clipmask to reflect how overlapping visual objects affect the motion video object, (i) display the memory on the display, and (j) re-start autonomous display using the updated clipmask.

32. A computer-implemented method for controlling a hardware video interface so as to combinedly display a motion video object combined with other visual objects comprising the steps of:
controlling the hardware video interface to execute an autonomous hardware loop in which successive frames of analog motion video information are received, the Successive frames of analog motion video information are each converted to successive frames of digital motion video information, and the successive frames of digital motion video information are each stored through a clipmask to a memory so as to constitute a motion video object, whereby the motion video object is autonomously displayed through a clipmask onto a screen;
checking whether there are invalidated regions on the screen;
in response to invalidated regions, stopping execution of the autonomous hardware loop, updating the screen, and restarting execution of the autonomous hardware loop;
said updating step comprising the steps of initializing a clipmask for the motion video object, drawing the motion video object through the clipmask to a memory, registering the clipmask, drawing the other visual objects to the memory and updating the clipmask so as to leave footprints of overlapping visual objects on the clipmask;
said restarting step comprising the steps of withdrawing registration of the clipmask, displaying the memory onto the screen, and passing the clipmask to the hardware video interface, whereby the motion video object is autonomously displayed by the autonomous hardware loop on the screen through the updated clipmask.

33. A method according to claim 32, wherein the motion video object and the visual objects are drawn to a frame composition memory, and further comprising the step of copying the frame composition memory to a frame memory from which objects are displayed onto the screen.

34. A method according to claim 32, wherein in said drawing step of said updating step, a bit map image of the motion video object is drawn.

35. A method according to claim 34, wherein the bit map image which corresponds to one frame of the motion video object and which is drawn to memory is comprised by a frame of a motion video object.

36. A method according to claim 34, wherein the bit map image which corresponds to one frame of the motion video object and which is drawn to memory is not comprised by a frame of the motion video object.

37. A method according to claim 36, wherein the bit map image which corresponds to one frame of the motion video object and which is drawn to memory is comprised by a neutral grey bit map image.

38. A method according to claim 32, wherein the clipmask is comprised by control words set to the hardware video interface.

* * * * *

UNITED STATES PATENT AND TRADEMARK OFFICE
CERTIFICATE OF CORRECTION

PATENT NO. : 5,500,933

DATED : March 19, 1996

INVENTOR(S): Peter Schnorf

It is certified that error appears in the above-identified patent and that said Letters Patent is hereby corrected as shown below:

COLUMN 3:

Line 20, "restarred" should read --restarted--; and
Line 41, "for-explaining" should read --for explaining--.

COLUMN 4:

Line 28, "other" should read --Other--; and
Line 46, "video" should read --Video--.

COLUMN 7:

Line 47, "restarred" should read --restarted--.

COLUMN 8:

Line 7, "with" should read --With--; and
Line 31, "redrawn-" should read --redrawn.--.

UNITED STATES PATENT AND TRADEMARK OFFICE
CERTIFICATE OF CORRECTION

PATENT NO. : 5,500,933

DATED : March 19, 1996

INVENTOR(S) : Peter Schnorf

It is certified that error appears in the above-identified patent and that said Letters Patent is hereby corrected as shown below:

COLUMN 9:

Line 17, "restarred." should read --restarted.--.

COLUMN 14:
Line 8
"Successive" should read --successive--.

Signed and Sealed this

Third Day of September, 1996

Attest:

BRUCE LEHMAN

Attesting Officer    Commissioner of Patents and Trademarks